US012765460B2

(12) United States Patent
Solimar Walter et al.

(10) Patent No.: US 12,765,460 B2
(45) Date of Patent: Oct. 20, 2026

(54) FEEDERHOUSE ASSEMBLIES, AGRICULTURAL HARVESTERS, AND METHODS OF CONNECTING HARVESTING HEADERS TO AGRICULTURAL HARVESTERS

(71) Applicant: AGCO DO BRASIL SA LTDA, Ribeireo Preto (BR)

(72) Inventors: Airton Solimar Walter, Nova Sant Rita (BR); Daniel Saraiva, Canoas (BR)

(73) Assignee: AGCO DO BRASIL SA LTDA, Ribeireo Preto (BR)

( * ) Notice: Subject to any disclaimer, the term of this patent is extended or adjusted under 35 U.S.C. 154(b) by 928 days.

(21) Appl. No.: 17/628,489

(22) PCT Filed: Jul. 8, 2020

(86) PCT No.: PCT/IB2020/056411
§ 371 (c)(1),
(2) Date: Jan. 19, 2022

(87) PCT Pub. No.: WO2021/014254
PCT Pub. Date: Jan. 28, 2021

(65) Prior Publication Data
US 2022/0256769 A1 Aug. 18, 2022

Related U.S. Application Data

(60) Provisional application No. 62/876,028, filed on Jul. 19, 2019.

(51) Int. Cl.
*A01F 12/10* (2006.01)
*A01D 41/14* (2006.01)

(52) U.S. Cl.
CPC ............ *A01D 41/145* (2013.01); *A01F 12/10* (2013.01)

(58) Field of Classification Search
CPC ...... A01D 41/14; A01D 41/145; A01D 34/28; A01D 34/283; A01D 34/286; A01F 12/10
See application file for complete search history.

(56) References Cited

U.S. PATENT DOCUMENTS 4,280,317 A * 7/1981 Lindblom .............. A01D 41/16 56/208
6,116,008 A * 9/2000 Digman ............... A01D 61/008 56/15.8

(Continued)

FOREIGN PATENT DOCUMENTS

CA 2110778 A1 6/1995
EP 3025575 A1 * 6/2016 ........... A01B 63/008

(Continued)

OTHER PUBLICATIONS

European Patent Office, International Search Report for related International Application No. PCT/IB2020/056411, mail date Nov. 23, 2020.

(Continued)

*Primary Examiner* — Justin C Mikowski
*Assistant Examiner* — Ashley A Kaercher

(57) ABSTRACT

A feederhouse assembly for an agricultural harvester includes a pitch frame adjacent the inlet end of a feederhouse and arranged to pivot relative to the feederhouse, and a hydraulic cylinder and a spring coupling the pitch frame to the feederhouse. A method of connecting a harvesting header to an agricultural harvester includes applying a spring force to a pitch frame adjacent an inlet end of a feederhouse, applying a hydraulic force cylinder to the pitch frame, balancing the hydraulic force and the spring force when the pitch frame is in an orientation corresponding to an orientation of the harvesting header, moving the agricultural harvester toward the harvesting header, and securing the harvesting header to the pitch frame. The spring force is (Continued)

oriented to rotate the pitch frame downward, and the hydraulic force is oriented to rotate the pitch frame upward.

10 Claims, 5 Drawing Sheets

(56) References Cited

U.S. PATENT DOCUMENTS

| | | | | |
|---|---|---|---|---|
| 2010/0071330 | A1 * | 3/2010 | Coers | A01D 41/14<br>56/14.5 |
| 2016/0165796 | A1 * | 6/2016 | Carpenedo | A01D 41/16<br>56/14.7 |
| 2018/0007832 | A1 * | 1/2018 | Matousek | A01D 41/145 |

FOREIGN PATENT DOCUMENTS

| | | | | |
|---|---|---|---|---|
| EP | 3025575 | B1 * | 10/2017 | A01D 41/16 |
| FR | 2662570 | A1 * | 12/1991 | A01B 59/04 |
| GB | 2167634 | A | 6/1986 | |

OTHER PUBLICATIONS

UK Intellectual Property Office, Search Report for related UK Application No. GB2000392.7, dated Jun. 29, 2020.

* cited by examiner

FEEDERHOUSE ASSEMBLIES, AGRICULTURAL HARVESTERS, AND METHODS OF CONNECTING HARVESTING HEADERS TO AGRICULTURAL HARVESTERS

CROSS-REFERENCE TO RELATED APPLICATION

This application claims the benefit of the filing date of U.S. Provisional Patent Application 62/876,028, "Feederhouse Assemblies, Agricultural Harvesters, and Methods of Connecting Harvesting Headers to Agricultural Harvesters," filed Jul. 19, 2019, the entire disclosure of which is incorporated herein by reference.

FIELD

This disclosure relates to self-propelled crop harvesting machines that include a header supported on the front end thereof, and particularly to a header attachment assembly that facilitates header pitch adjustment.

BACKGROUND

Self-propelled agricultural harvesters are well known and include, by way of example, combine harvesters, windrowers, and forage harvesters, all of which typically include a frame or chassis, an operator cab, an engine, and ground-engaging wheels or tracks. A cutting or pick-up header is often carried by the harvester, the header typically being considerably wider than the harvester and mounted to the front side of a feederhouse.

Crop material collected by the header is conveyed into the feederhouse before being conveyed in a generally rearward direction to crop-processing apparatus. In the case of a combine harvester, the processing apparatus serves to thresh the crop material and separate grain therefrom, whereas, in the case of a forage harvester or windrower the crop material is typically passed through conditioning rollers.

The height of the header is typically adjusted by raising and lowering the feederhouse around a lateral feederhouse pivot axis. To permit pitch adjustment of the header with respect to the feederhouse, a header interface frame is often pivotally mounted to the feederhouse over the front opening thereof to permit pitch adjustment around a lateral pitch adjustment axis. A hydraulic cylinder controls adjustment of the lateral tilt.

U.S. Patent Application Publication 2014/0041352, "Automatic Header Electronic Pitch Control," published Feb. 13, 2014, discloses a combine harvester having a header interface frame that allows for adjustment of the header pitch.

As headers get wider and heavier, larger hydraulic cylinders are required to control the lateral pitch. This places strain on the fixings and weldments adding to the cost and complexity of the feederhouse structure.

BRIEF SUMMARY

In some embodiments, a feederhouse assembly for an agricultural harvester includes a feederhouse comprising an inlet end, a pitch frame adjacent the inlet end and arranged to pivot about a pivot axis relative to the feederhouse, a hydraulic cylinder coupling the pitch frame to the feederhouse and configured to apply a hydraulic force to rotate the pitch frame upward, and a spring coupling the pitch frame to the feederhouse and configured to apply a spring force to rotate the pitch frame downward.

A method of connecting a harvesting header to an agricultural harvester includes applying a spring force from a spring to a pitch frame adjacent an inlet end of a feederhouse, applying a hydraulic force from a hydraulic cylinder to the pitch frame, balancing the hydraulic force and the spring force when the pitch frame is in an orientation corresponding to an orientation of the harvesting header, moving the agricultural harvester toward the harvesting header, and securing the harvesting header to the pitch frame. The spring force is oriented to rotate the pitch frame downward, and the hydraulic force is oriented to rotate the pitch frame upward.

An agricultural harvester includes a chassis, a feederhouse mounted to the chassis and comprising an inlet end, a pitch frame adjacent the inlet end and arranged to pivot about a pivot axis relative to the feederhouse, a hydraulic cylinder coupling the pitch frame to the feederhouse and configured to apply a hydraulic force to rotate the pitch frame upward, a spring coupling the pitch frame to the feederhouse and configured to apply a spring force to rotate the pitch frame downward, and a processing system carried by the chassis and structured to receive crop material from the feederhouse.

A non-transitory computer-readable storage medium includes instructions that when executed by a computer, cause the computer to balance a hydraulic force and a spring force on a pitch frame adjacent an inlet end of a feederhouse of an agricultural harvester. When the pitch frame is in an orientation corresponding to an orientation of a harvesting header, the computer moves the agricultural harvester toward the harvesting header and secures the harvesting header to the pitch frame.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
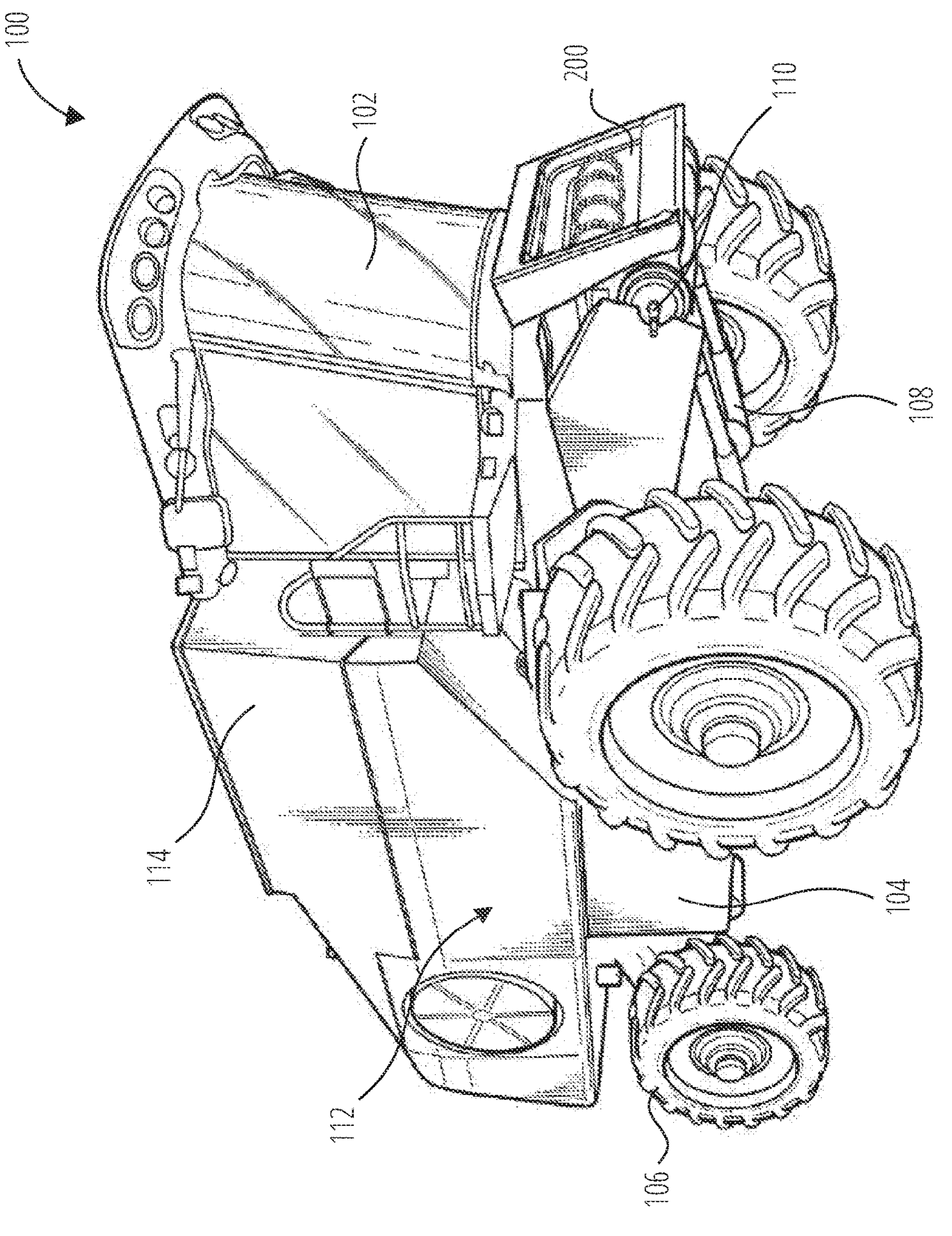
FIG. 1 is a simplified front perspective view of an example agricultural harvester.

The illustrations presented herein are not actual views of any agricultural harvester or portion thereof, but are merely idealized representations that are employed to describe example embodiments of the present disclosure. Additionally, elements common between figures may retain the same numerical designation.

The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, the drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

FIG. 1 illustrates an example agricultural harvester embodied as a combine harvester 100. In the context of the present disclosure, the example combine harvester 100 is merely illustrative, and other machines and/or implements with like functionality may deploy certain embodiments disclosed herein, such as windrowers, forage harvesters, etc. The example combine harvester 100 is shown in FIG. 1 without a header attached, and includes a feederhouse assembly 200 carried by a chassis 104 supported by wheels 106. An operator cab 102 is mounted to the chassis 104. In some embodiments, other or additional forms of travel may be used, such as tracks. Hydraulic cylinders 108 are shown affixed to the underside of the feederhouse assembly 200 on one end and to the chassis 104 on the other end. The feederhouse assembly 200 may move (e.g., up and down, pitch, tilt, etc.) based on actuation of the hydraulic cylinders 108, which causes a detachably coupled header to also be raised, lowered, pitched, and/or tilted. A rotating shaft 110 may be configured to provide mechanical power to a header during operation of the combine harvester 100. The rotating shaft 110 may be configured to operate at various speeds, as described in, for example, U.S. Pat. No. 9,434,252, "Power Takeoff Drive System for a Vehicle," issued Sep. 6, 2016.

In general, the combine harvester 100 cuts crop materials (e.g., using the header), wherein the cut crop materials are delivered to the front end of the feederhouse assembly 200. Such crop materials are moved upwardly and rearwardly within and beyond the feederhouse assembly 200 (e.g., by a conveyer) until reaching a processing system 112 comprising a thresher rotor. In one embodiment, the thresher rotor may comprise a single, transverse rotor, such as that found in a Gleaner® Super Series Combine by AGCO. Other designs may be used, such as axial-based, twin rotor, or hybrid designs. The thresher rotor processes the crop materials in known manner and passes a portion of the crop material (e.g., heavier chaff, corn stalks, etc.) toward the rear of the combine harvester 100 and another portion (e.g., grain and possibly light chaff) through a cleaning process in known manner. In the processing system 112, the crop materials undergo threshing and separating operations. In other words, the crop materials are threshed and separated by the thresher rotor operating in cooperation with well-known foraminous processing members in the form of threshing concave assemblies and separator grate assemblies, with the grain (and possibly light chaff) escaping through the concave assemblies and the grate assemblies and to a cleaning system located beneath the processor to facilitate the cleaning of the heavier crop material. Bulkier stalk and leaf materials are generally retained by the concave assemblies and the grate assemblies and are discharged out from the processing system 112 and ultimately out of the rear of the combine harvester 100. The cleaned grain that drops to the bottom of the cleaning system is delivered by a conveying mechanism that transports the grain to an elevator, which conveys the grain to a grain bin 114 located at the top of the combine harvester 100. Any remaining chaff and partially or unthreshed grain is recirculated through the processing system 112 via a tailings return conveying mechanism. Because combine processing is known to those having ordinary skill in the art, further discussion thereof is omitted here for brevity. In embodiments in which the agricultural harvester is a windrower or forage harvester, the processing system 112 may include conditioning rollers, rather than separation devices.

Figure 2:
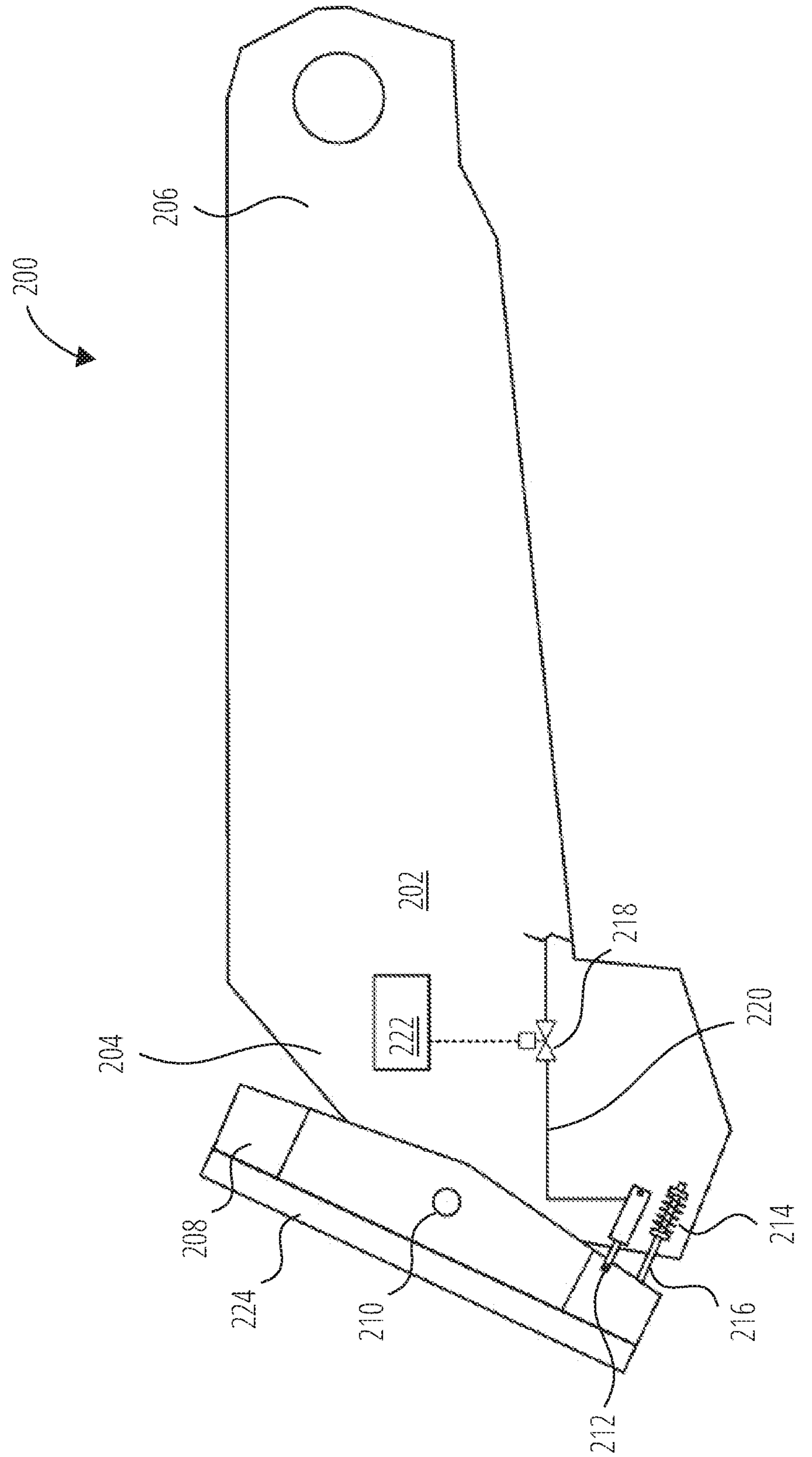
FIG. 2 illustrates a feederhouse assembly having a pitch frame, which may be a part of the agricultural harvester shown in FIG. 1.

FIG. 2 is a simplified side view of the feederhouse assembly 200 shown in FIG. 1. As shown, a feederhouse 202 has an inlet end 204 and an outlet end 206. Crop material entering the feederhouse assembly 200 from the harvesting header travels from the inlet end 204 toward the outlet end 206 on the way to the processing system 112 (FIG. 1). The harvesting header is coupled to the feederhouse 202 by a pitch frame 208, which is adjustable to control the orientation of the harvesting header with respect to the combine harvester 100. A tilt frame 224 may optionally be coupled to pitch frame 208 to enable side inclination of the harvesting header (e.g., wherein the left side of the header is at a different elevation than the right side). Control of the pitch and tilt of the harvesting header is important to enable a farmer to properly harvest crops by keeping the harvesting header parallel to the ground. Adjustment of the pitch frame 208 also facilitates connecting and disconnecting the harvesting header because the pitch frame 208 can be positioned to match the pitch of the harvesting header.

The pitch frame 208 is adjusted by pivoting about a pivot axis 210. A hydraulic cylinder 212 and a spring 214 couple the pitch frame 208 with the feederhouse 202. The hydraulic cylinder 212 is configured to apply a force on the pitch frame 208 (referred to herein as a hydraulic force, though the force acting on the pitch frame 208 is due to movement of a piston of the hydraulic cylinder 212, rather than by direct contact of hydraulic fluid on the pitch frame 208). The hydraulic force is applied to the pitch frame 208 in a direction to rotate the pitch frame 208 upward. The hydraulic cylinder 212 is located below the pivot axis 210, such that when pressurized fluid in the hydraulic cylinder 212 pushes the piston outward, the hydraulic cylinder 212 pushes the bottom of the pitch frame 208 away from the feederhouse 202. Because the pitch frame 208 is constrained to the feederhouse 202 at the pivot axis 210, the pitch frame 208 pitches upward.

The hydraulic cylinder 212 may be a single-action hydraulic cylinder. The piston of a single-action hydraulic cylinder is driven only in a single direction by the hydraulic fluid. Thus, the hydraulic cylinder 212 may be connected to only a single pressure line 220. In contrast with double-action hydraulic cylinders, which can be driven in two opposite directions by fluid in two pressure lines, single-action hydraulic cylinders may be smaller, simpler, and/or less expensive to manufacture and maintain. The weight of the harvesting header or another load on the pitch frame 208 forces the pitch frame 208 to pitch downward, absent a balancing force of the hydraulic cylinder 212 on the pitch frame 208. Typically, the hydraulic cylinder 212 is configured such that pressurized fluid pushes the piston outward. In such embodiments, the hydraulic cylinder 212 is connected to the pitch frame 208 and the feederhouse 202 below the pivot axis 210. In other embodiments, the pressurized fluid may push the piston inward, in which case the hydraulic cylinder 212 may be located above the pivot axis 210.

The spring 214 is configured to apply a spring force on the pitch frame 208 via a rod 216 coupled to the pitch frame 208. The spring force is applied in a parallel and opposite direction from the hydraulic force. The spring force tends to return the hydraulic cylinder 212 to a compressed position. In FIG. 2, the hydraulic cylinder 212 is shown extended, and the spring 214 is shown compressed.

Figure 3:
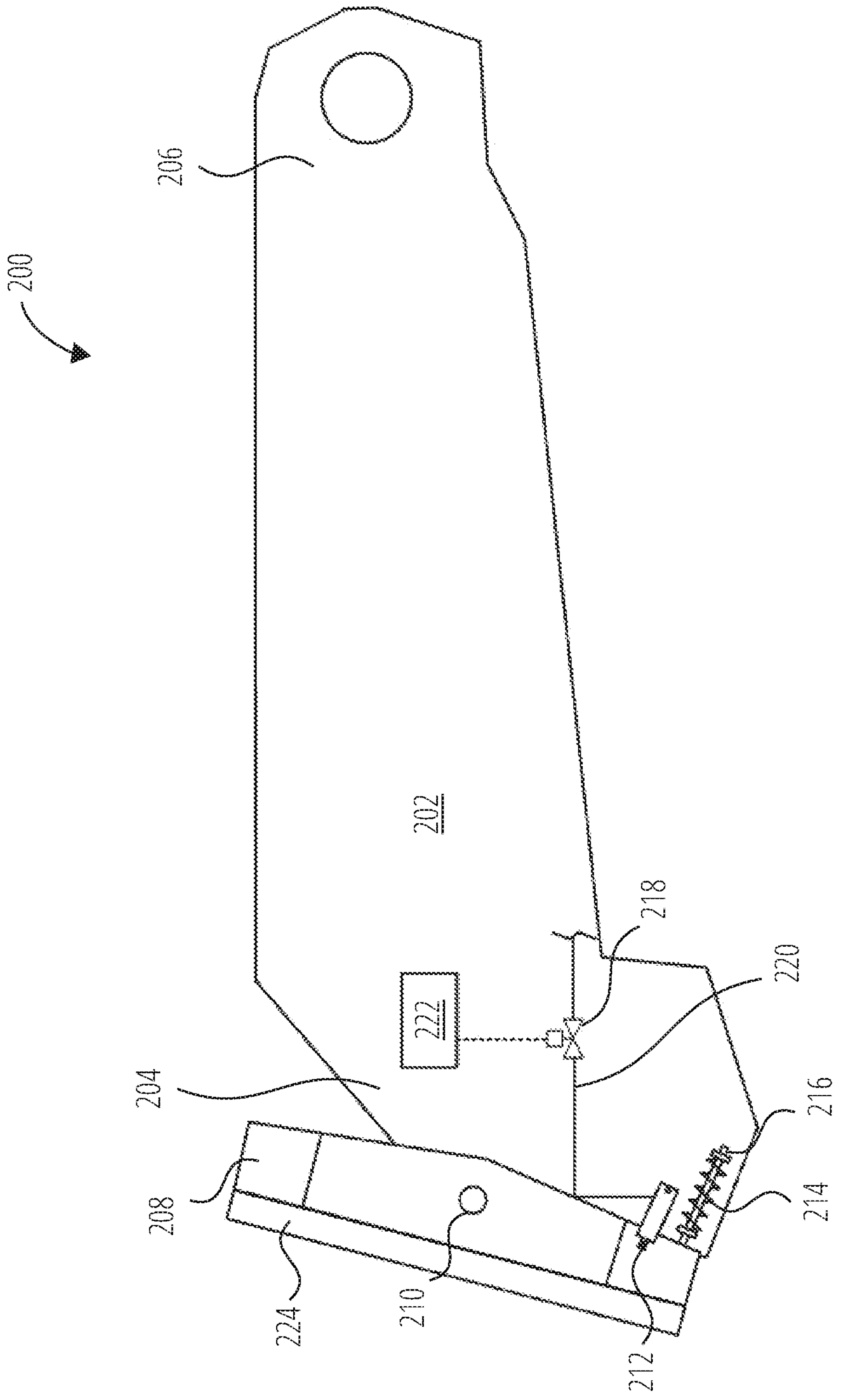
FIG. 3 illustrates another orientation of the pitch frame on the feederhouse assembly shown in FIG. 2.

FIG. 3 is a simplified side view of the feederhouse assembly 200 when the pitch frame 208 is pitched relatively downward from the orientation shown in FIG. 2. The piston of the hydraulic cylinder 212 is shown in FIG. 3 in its compressed (i.e., not extended) position. In this embodiment, the configuration of the spring 214 shown in FIG. 3 is its natural state, and the configuration of the spring 214 shown in FIG. 2 is compressed. Thus, when the spring 214 is compressed as shown in FIG. 2, the spring 214 exerts the spring force on the pitch frame 208 via the rod 216; when the spring 214 is not compressed, as shown in FIG. 3, the spring force is decreased or even zero. Thus, the spring 214 is depicted as a compression spring. In other embodiments, the spring 214 may be an extension spring, and the connection to the pitch frame 208 may be altered such that the spring nonetheless applies the spring force in the appropriate direction. In further embodiments, a compression spring may be located above the pivot axis 210 with different mounting hardware, such that the compression spring pushes the top of the pitch frame 208 forward.

Though the hydraulic cylinder 212 is depicted above the spring 214 in FIG. 2 and FIG. 3 for clarity, these parts may also be located horizontally adjacent one another on the pitch frame 208. Furthermore, the feederhouse assembly 200 may typically include two or more of each of the hydraulic cylinder 212 and the spring 214 (e.g., one of each at each side of the pitch frame 208).

The feederhouse assembly 200 may also include a control valve 218 connected to the hydraulic cylinder 212 by a fluid line 220 to modify the pressure of fluid in the hydraulic cylinder 212. The control valve 218 may be connected to a fluid source, such as a reservoir or compressor. A controller 222 may operate the control valve 218, and may interact with a control system of the combine harvester 100 (FIG. 1), such as a terminal in the operator cab 102. For example, the controller 222 may send and receive electrical signals to the control valve 218.

The spring 214 may be selected such that it exerts a large enough force to overcome the force of the hydraulic cylinder 212 when the fluid line 220 is not pressurized. That is, the spring 214 should be strong enough to push the pitch frame 208 downward against the force of the hydraulic cylinder 212 when the hydraulic cylinder 212 is exerting its minimum hydraulic force. When the hydraulic cylinder 212 is fully extended, the spring 214 is more compressed, so the spring force is larger than when the spring 214 is less compressed. Thus, the speed at which the pitch frame 208 moves when the hydraulic cylinder 212 is not pressurized may not be constant. Nonetheless, the spring force enables the agricultural harvester to lower the pitch frame 208 when the harvesting header is not attached. Because rotating the pitch frame 208 downward without the harvesting header attached is not generally time-sensitive, it may be acceptable for the spring force to only slightly overcome the minimum hydraulic force in the range in which downward motion is desired. Thus, the combine harvester 100 may take, for example, 30 seconds or more to lower the pitch frame 208 to a selected "low" position when the harvesting header is not attached (which may be higher than the lowest possible position when a header is attached). When the harvesting header is attached, the weight of the harvesting header provides additional downward force, so the pitch frame 208 can be lowered more quickly and potentially farther than it could with only the spring force and the weight of the pitch frame 208 itself.

Figure 4:
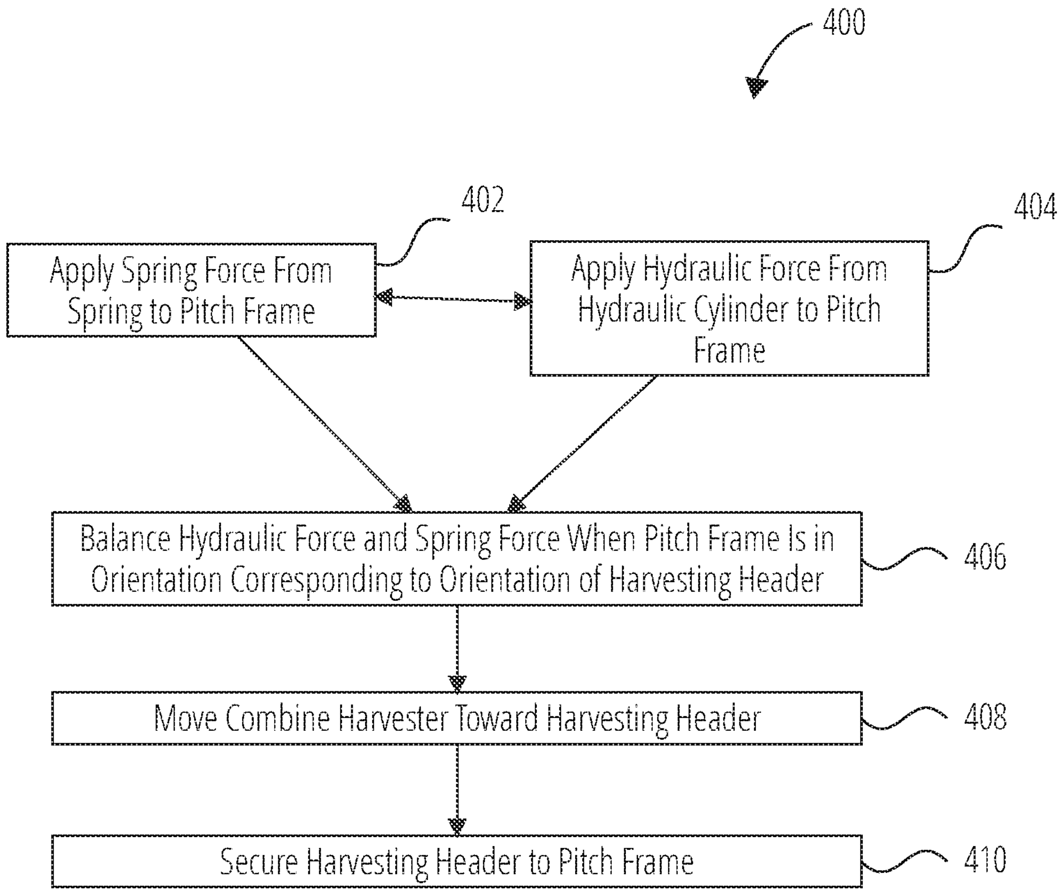
FIG. 4 is a simplified flow chart illustrating an example method of connecting a harvesting header to an agricultural harvester.

FIG. 4 is a simplified flow chart illustrating a method 400 of connecting a harvesting header to a combine harvester, such as the combine harvester 100 shown in FIG. 1 and having a feederhouse assembly 200 as shown in FIG. 2 and FIG. 3. As shown in block 402 of FIG. 4, the spring 214 applies a spring force to the pitch frame 208 adjacent the inlet end 204 of the feederhouse 202. The spring force is oriented to rotate the pitch frame 208 downward.

As shown in block 404, the hydraulic cylinder 212 applies a hydraulic force to the pitch frame 208. The hydraulic force is oriented to pitch the pitch frame upward, and is in a direction opposite the spring force.

Block 402 and block 404 may occur at the same time or may occur in any order. Block 406 depicts balancing the hydraulic force and the spring force when the pitch frame is in an orientation corresponding to an orientation of the harvesting header. The weight of the pitch frame 208 may also be included in this balancing, such that the pitch frame 208 is at the proper orientation to connect with the harvesting header.

As shown in block 408, the combine harvester moves toward the harvesting header. The harvesting header is secured to the pitch frame in block 410.

For example, the controller 222 may be configured to cause mechanical coupling between the pitch frame 208 and the harvesting header without intervention by any person located proximal to the coupling location. When the pitch frame 208 is near a harvesting header, sensors may detect the orientation and position of the harvesting header and of the pitch frame 208. The controller 222 may receive information from the sensors, and may adjust the pressure provided to the hydraulic cylinder 212 by the control valve 218 to match the orientation of the pitch frame 208 to the orientation of the harvesting header. The controller 222 may then alert an operator to move the combine harvester 100 forward until it meets the harvesting header, or may provide a signal to the control system of the combine harvester 100 to perform this action automatically. Thus, the harvesting header may be connected without requiring the operator to make any measurements or adjustments at the point of connection. This may increase safety by enabling the operator to remain away from pinch points. Connecting harvesting headers is described in further detail in U.S. Pat. No. 10,034,425, "Automatic Header Coupling," issued Jul. 31, 2018.

Figure 5:
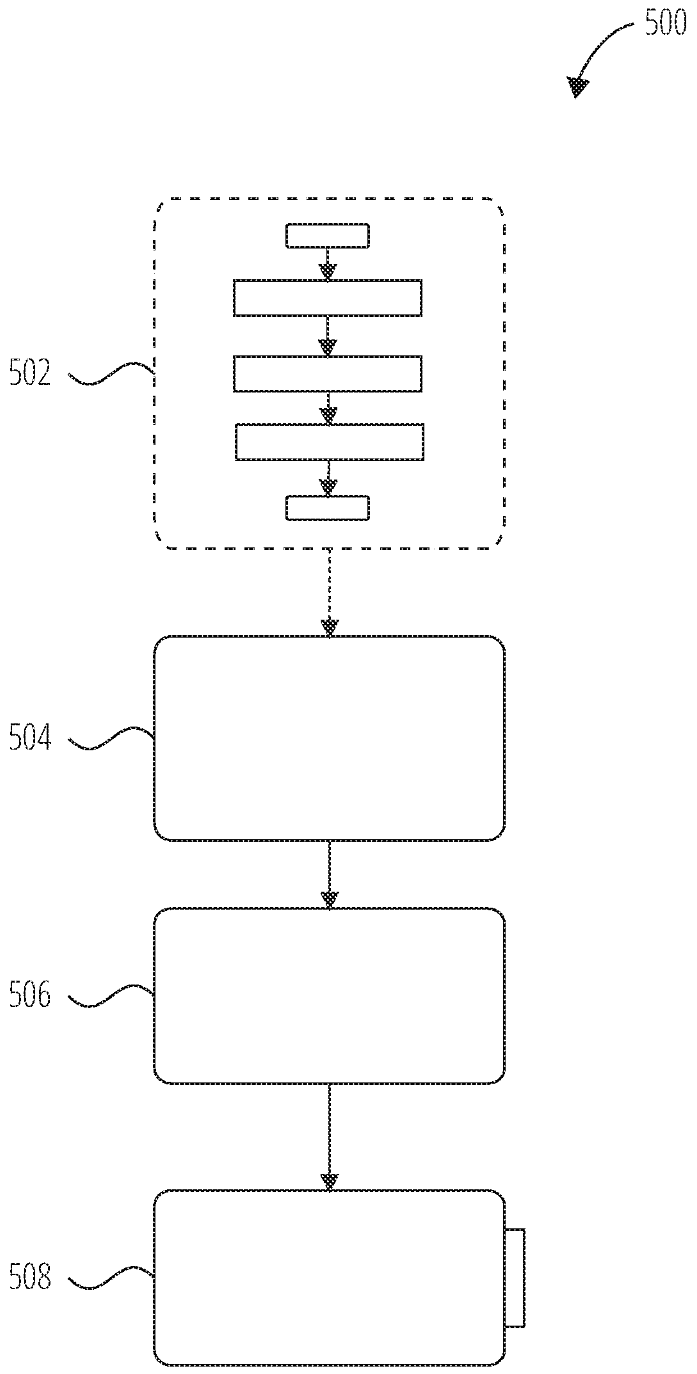
FIG. 5 illustrates an example computer-readable storage medium comprising processor-executable instructions configured to embody a method of connecting a harvesting header to an agricultural harvester, such as the method illustrated in FIG. 4.

Still other embodiments involve a computer-readable storage medium (e.g., a non-transitory computer-readable storage medium) having processor-executable instructions configured to implement one or more of the techniques presented herein. An example computer-readable medium that may be devised is illustrated in FIG. 5, wherein an implementation 500 includes a computer-readable storage medium 502 (e.g., a flash drive, CD-R, DVD-R, application-specific integrated circuit (ASIC), field-programmable gate array (FPGA), a platter of a hard disk drive, etc.), on which is computer-readable data 504. This computer-readable data 504 in turn includes a set of processor-executable instructions 506 configured to operate according to one or more of the principles set forth herein. In some embodiments, the processor-executable instructions 506 may be configured to cause a computer to perform operations 508 when executed via a processing unit, such as at least some of the example method 400 depicted in FIG. 4. Many such computer-readable media may be devised by those of ordinary skill in the art that are configured to operate in accordance with one or more of the techniques presented herein.

Advantages of including a spring in the feederhouse assembly disclosed herein is that single-action hydraulic cylinders can be used to control the pitch of the harvesting header. Single-action hydraulic cylinders are generally lighter and cheaper than dual-action hydraulic cylinders. If a dual-action hydraulic cylinder is replaced directly with a single-action hydraulic cylinder, the agricultural harvester can rely on the weight of the harvesting header to rotate the pitch frame downward. However, when the harvesting header is not attached, the agricultural harvester does not have a safe method for rotating the pitch frame downward. This makes it difficult to attach a harvesting header, because the pitch frame must be aligned with the harvesting header. One method that has been used by some operators is to press the pitch frame on the ground and drive the agricultural harvester forward. This, however, can damage the pitch frame, and can be more dangerous than a pitch control system.

Additional non-limiting example embodiments of the disclosure are described below.

Embodiment 1: A feederhouse assembly for an agricultural harvester, the feederhouse assembly comprising a feederhouse comprising an inlet end, a pitch frame adjacent the inlet end and arranged to pivot about a pivot axis relative to the feederhouse, a hydraulic cylinder coupling the pitch frame to the feederhouse and configured to apply a hydraulic force to rotate the pitch frame upward, and a spring coupling the pitch frame to the feederhouse and configured to apply a spring force to rotate the pitch frame downward.

Embodiment 2: The feederhouse assembly of Embodiment 1, wherein the hydraulic cylinder comprises a single-action hydraulic cylinder.

Embodiment 3: The feederhouse assembly of Embodiment 1 or Embodiment 2, wherein the hydraulic cylinder is configured to apply the hydraulic force below the pivot axis.

Embodiment 4: The feederhouse assembly of any one of Embodiments 1 through 3, wherein the spring is configured to apply the spring force below the pivot axis.

Embodiment 5: The feederhouse assembly of any one of Embodiments 1 through 4, wherein the spring and the hydraulic cylinder are configured to apply the spring force and the hydraulic force parallel to one another.

Embodiment 6: The feederhouse assembly of any one of Embodiments 1 through 5, further comprising a control valve configured to modify pressure of a hydraulic fluid in the hydraulic cylinder.

Embodiment 7: The feederhouse assembly of Embodiment 6, further comprising a controller configured to operate the control valve.

Embodiment 8: The feederhouse assembly of Embodiment 7, wherein the controller is configured to cause mechanical coupling between pitch frame and the harvesting header without intervention by any person located proximal to a coupling location.

Embodiment 9: A method of connecting a harvesting header to an agricultural harvester, the method comprising applying a spring force from a spring to a pitch frame adjacent an inlet end of a feederhouse, applying a hydraulic force from a hydraulic cylinder to the pitch frame, balancing the hydraulic force and the spring force when the pitch frame is in an orientation corresponding to an orientation of the harvesting header, moving the agricultural harvester toward the harvesting header, and securing the harvesting header to the pitch frame. The spring force is oriented to rotate the pitch frame downward, and the hydraulic force is oriented to rotate the pitch frame upward.

Embodiment 10: The method of Embodiment 9, wherein applying the hydraulic force comprises providing a pressurized fluid to the hydraulic cylinder.

Embodiment 11: The method of Embodiment 9 or Embodiment 10, wherein the hydraulic force and the spring force are applied parallel to one another.

Embodiment 12: The method of any one of Embodiments 9 through 11, wherein applying the spring force comprises applying the spring force below a pivot axis of the pitch frame.

Embodiment 13: The method of any one of Embodiments 9 through 12, wherein applying the hydraulic force comprises applying the hydraulic force below a pivot axis of the pitch frame.

Embodiment 14: The method of any one of Embodiments 9 through 13, wherein securing the harvesting header to the pitch frame comprises securing the harvesting header to the pitch frame without intervention by any person located proximal to a coupling location.

Embodiment 15: An agricultural harvester, comprising a chassis, a feederhouse mounted to the chassis and comprising an inlet end, a pitch frame adjacent the inlet end and arranged to pivot about a pivot axis relative to the feederhouse, a hydraulic cylinder coupling the pitch frame to the feederhouse and configured to apply a hydraulic force to rotate the pitch frame upward, a spring coupling the pitch frame to the feederhouse and configured to apply a spring force to rotate the pitch frame downward, and a processing system carried by the chassis and structured to receive crop material from the feederhouse.

Embodiment 16: The agricultural harvester of Embodiment 15, further comprising a grain bin carried by the chassis and structured to receive grain from the processing system.

Embodiment 17: A non-transitory computer-readable storage medium, the computer-readable storage medium including instructions that when executed by a computer, cause the computer to balance a hydraulic force and a spring force on a pitch frame adjacent an inlet end of a feederhouse of an agricultural harvester. When the pitch frame is in an orientation corresponding to an orientation of a harvesting header, the computer moves the agricultural harvester toward the harvesting header and secures the harvesting header to the pitch frame.

All references cited herein are incorporated herein in their entireties. If there is a conflict between definitions herein and in an incorporated reference, the definition herein shall control.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

What is claimed is:

1. A feederhouse assembly for an agricultural harvester with a harvesting header, the feederhouse assembly comprising:

a feederhouse comprising an inlet end;

a pitch frame adjacent the inlet end and arranged to pivot about a pivot axis relative to the feederhouse, the pitch frame moveable between an operational position for receiving a harvesting header and a lowered position for when a harvesting header is not mounted on the pitch frame;

a hydraulic cylinder coupling the pitch frame to the feederhouse and configured to apply a hydraulic force to rotate the pitch frame upward when the hydraulic cylinder is in a pressurized state;

a control valve configured to modify pressure of a hydraulic fluid in the hydraulic cylinder between the pressurized state of the hydraulic cylinder and a reduced pressurized state; and a spring coupling the pitch frame to the feederhouse and configured to apply a spring force to the pitch frame, wherein the spring rotates the pitch frame downward to the lowered position when the hydraulic cylinder is in the reduced pressurized state.

2. The feederhouse assembly of claim 1, wherein the hydraulic cylinder comprises a single-action hydraulic cylinder.

3. The feederhouse assembly of claim 1, wherein the hydraulic cylinder is configured to apply the hydraulic force below the pivot axis.

4. The feederhouse assembly of claim 1, wherein the spring is configured to apply the spring force below the pivot axis.

5. The feederhouse assembly of claim 1, wherein the spring and the hydraulic cylinder are configured to apply the spring force and the hydraulic force parallel to one another.

6. The feederhouse assembly of claim 1, further comprising a controller configured to operate the control valve.

7. The feederhouse assembly of claim 6, wherein the controller is configured to cause mechanical coupling between pitch frame and the harvesting header without intervention by any person located proximal to a coupling location.

8. An agricultural harvester, comprising:

a chassis;

the feederhouse assembly of claim 1 mounted to the chassis; and a processing system carried by the chassis and structured to receive crop material from the feederhouse.

9. The agricultural harvester of claim 8, further comprising a grain bin carried by the chassis and structured to receive grain from the processing system.

10. The agricultural harvester of claim 8, further comprising a harvesting header mountable to the feederhouse assembly, wherein the spring is configured such that the spring force is sufficient to rotate the pitch frame downward to the lowered position when the hydraulic cylinder is in the reduced pressurized state and the harvesting header is removed from the feederhouse assembly.

* * * * *